MULTISENSOR OPTICAL RECORDING APPARATUS
Filed Aug. 6, 1965
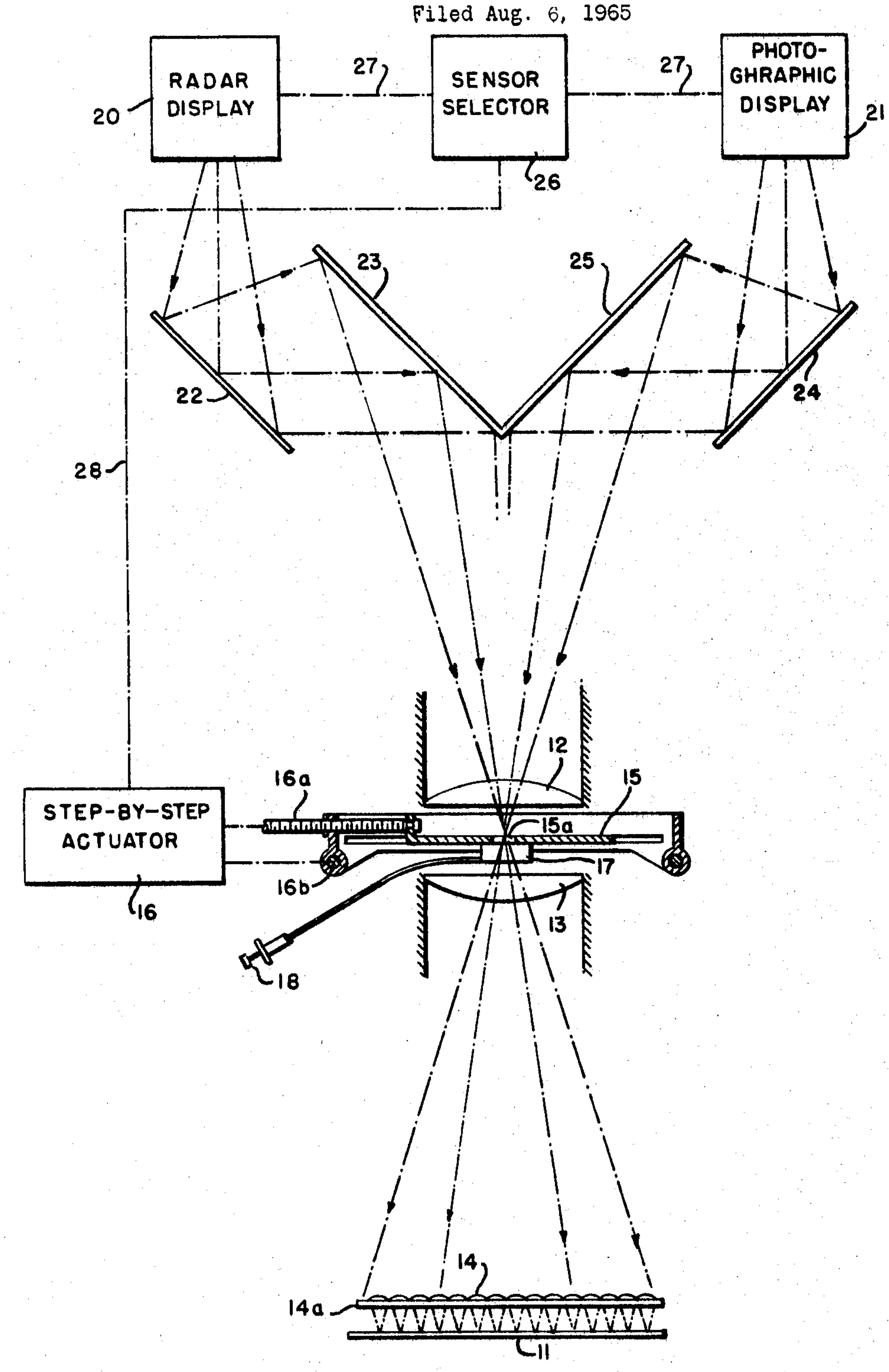

United States Patent Office 3,387,532

Patented June 11, 1968

3,387,532

MULTISENSOR OPTICAL RECORDING APPARATUS

Clayton W. Houghton, Smithtown, and Revere G. Sanders, Glen Head, N.Y., assignors to Aeroflex Laboratories Incorporated, a corporation of Delaware Filed Aug. 6, 1965, Ser. No. 477,684
3 Claims. (Cl. 88—24)

This invention relates to multisensor optical recording apparatus and particularly to such apparatus by means of which dissected and interdigitated images from a plurality of sensors may be developed successively on a single common frame or format area of desired size by a photosensitive film or plate.

In the copending application of Clayton W. Houghton, Ser. No. 477,895, filed concurrently herewith, now abandoned, there is described and claimed an optical-translating appartus by which such dissected and interdigitated images may be developed successively on a single frame or format area and also by which the images so recorded may then be viewed one at a time by apparatus generally complementary to that used in the recording of the images. The apparatus of the present invention is of the type described in such copending application but modified to receive image information from any of a plurality of related image sources or sensors, for example, by photographic, infrared, radar and the like displays, data panels, etc.

In prior apparatus for recording images derived from a plurality of sensors, it has been the practice to record each type of information on a separate strip-film or on a series of film frames, the films then being processed and displayed in a manner to enable the viewer to correlate the related data on the multiple films. Such an arrangement is cumbersome and bulky and presents difficulties in accurately correlating the information contained in the related multiple images.

It is an object of the invention, therefore, to provide a new and improved multisensor optical recording apparatus which obviates the above-mentioned limitations on prior apparatus for recording information from a plurality of sensors.

It is another object of the invention to provide a new and improved multisensor optical recording apparatus by means of which images from a plurality of related sensors are recorded as a series of dissected interdigitated images within one common film frame or format of a size determined by the field of the objective lens.

In accordance with the invention, there is provided optical apparatus for selectively recording substantially planar images from any of a plurality of sensors comprising an objective lens system, optical means for translating to the lens system the images of all of the sensors disposed effectively at one focal plane of the lens system, a planar lenticular array of minute lenslets disposed substantially at the conjugate focal plane of the lens system, and an aperture element disposed at the nodal plane of the lens system and movable in discrete steps in at least one direction normal to the optical axis thereof, whereby successive step-by-step movements of the aperture element record complete interdigitated images from selected sensors on a photosensitive element disposed in the focal plane of the lenticular array.

For a better understanding of the present invention, together with other and further objects thereof, reference is had to the following description, taken in connection with the accompanying drawing, while its scope will be pointed out in the appended claims.

Referring now to the drawing:

The single figure is a schematic representation of a multisensor optical recording apparatus embodying the invention.

Referring now more specifically to the drawing, there is shown a multisensor optical recording apparatus in which the elements corresponding to the apparatus of the aforesaid copending application are identified by the same reference numerals. The apparatus shown in the drawing is capable of selectively recording substantially planar images from any of a plurality of planar sensors in a common plane, for example from a radar display scope 20 or a photographic or camera display 21, the displays of the devices 20 and 21 lying in a common plane or any other arrangement in common focus to the lens system.

The apparatus shown in the drawing further comprises an objective lens system, shown by way of example as including a pair of closely spaced lens elements 12 and 13. The apparatus further comprises optical means for translating to the lens system 12, 13, images of the sensors which are disposed effectively at one focal plane of the lens system. This optical means may be in the form of a pair of reflecting mirror 22, 23 for the radar display 20 and the pair of mirrors 24, 25 for the photographic display device 21. When it is stated that the sensors are disposed effectively at a focal plane of the lens system 12, 13, it is meant that either a real image, such as the face of an oscilloscope in the radar display 20, or a virtual image, such as may be formed by the photographic display device 21, is so disposed that the total length of the optical path from the sensor to the objective lens system 12, 13 is within the focal length of the lens system as modified by the "*f*" number of the system.

The apparatus shown in the drawing further comprises a planar lenticular array 14 disposed substantially at the conjugate focal plane of the lens system comprising the elements 12, 13. The lenslets of the array 14 may comprise an assembly of hemispheres or lens shapes of the order of 0.14 mm. diameter and an aperture of *f*2.2 and may be arranged in a random pattern although, in certain instances, it may be desirable to arrange them in a predetermined pattern for certain applications. The lenslets of the array 14 may be formed of an optical plastic material with an index of refraction preferably of approximately 1.3 and may be supported on an optical glass plate **14*a*** by the use of a transparent cement.

Disposed at the nodal plane of the lens system, for example between the lens elements 12 and 13, is an aperture element or plate 15 having an aperture **15*a* therein of dimensions of a lower order of magnitude than those of the field of the lens system 12,13. The aperture element 15 is movable in discrete steps in at least one direction normal to the optical axis thereof and preferably throughout the effective aperture of the lens system. To this end, there is illustrated schematically a step-by-step actuator mechanism 16, which may be of any well known type, terminating in a threaded lead screw 16*a* for adjusting the aperture element 15 right and left and a lead screw 16*b* for adjusting the aperture element 15 in and out, as viewed in the drawing, thus moving the aperture element 15 in two orthogonal directions normal to the optical axis of the lens system comprising elements 12, 13. In a modification of the invention, the aperture element 15 is moved only in a single direction and the hemispherical lenslets of the array 14 are replaced by linear or semicylindrical lenslets extending in a drection normal to the direction of movement of the aperture element 15.**

The recording apparatus of the invention further includes a conventional shutter cap 17 which may be mounted on the aperture element 15 and adjustable by any suitable actuating means such as a push rod 18 to effect an exposure of the photosensitive element 11 between successive movements of the aperture element 15.

While, in the apparatus illustrated in the drawing, two sensors 20, 21 are shown, it will be apparent that the system may include any number of sensors in an array about the optical axis of the lens system 12, 13. The display units, such as the devices 20, 21, may be selectively activated by a sensor selector unit 26 coupled to the devices 20, 21 by a mechanism indicated schematically at 27 and coupled to the actuator 16 by a mechanism indicated schematically at 28 to provide any desired relation between the movements of the aperture element 15 and the activation of the units 20, 21.

As explained in more detail in the aforesaid copending application, when the aperture element 15 is in the position shown in solid lines, a visual image from one of the display devices 20, 21, as selected by the unit 26, is focused upon the lenticular array 14 through the aperture 15*a* in a conventional manner. The array 14 then dissects the image pattern formed thereon into a pattern of minute image spots upon the photosensitive element 11, as indicated. If the aperture element 15 is moved in a direction normal to the optical axis of the lens system 12, 13, the shifting angle of the rays of the display device, as impinging upon the lenslets of the array 14, shifts the minute image spots formed upon the photosensitive element 11 to form a new dissected image of image spots interdigitated with the first pattern.

Thus, by forming one such pattern from the image on the display device 20, actuating the aperture element 15 a small discrete distance and simultaneously actuating the selector 26 to deactivate the display device 20 and activate the display device 21, a dissected image from the latter device is formed on the photosensitive element 11 separate and distinct from the first pattern. In the event that it is desired to record only single displays from each of the devices 20 and 21, the aperture element 15 need be moved only between two positions. However, if it is desired to record a series of successive images displayed by each of the units 20 and 21, then the shutter 17 may be actuated to form a plurality of interdigitated dissected images of the displays of each of the devices 20 and 21 in any desired sequence, for example alternately from one and the other.

The recorded photosensitive element 11 may then be viewed by the apparatus shown in FIG. 3 of aforesaid copending application, namely, apparatus which is roughly complementary to the recording apparatus, the source of illumination being an illuminated diffusing screen disposed in the focal plane of the lens system 12, 13.

While there has been described what is, at present, considered to be the preferred embodiment of the invention, it will be apparent to those skilled in the art that various changes and modifications may be made therein, without departing from the invention, and it is, therefore, aimed in the appended claims to cover all such changes and modifications as fall within the true spirit and scope of the invention,

What is claimed is:

1. An optical apparatus for selectively recording substantially planar images from any of a plurality of sensors comprising:

an objective lens system;

optical means for translating to said lens system the images of all of said sensors disposed effectively at one focal plane of said lens system;

a planar lenticular array of minute lenslets disposed substantially at the conjugate focal plane of said lens system;

and an aperture element disposed at the nodal plane of said lens system and movable in discrete steps in at least one direction normal to the optical axis thereof;

whereby successive step-by-step movements of said aperture element record complete interdigitated images from selected sensors on a photosensitive element disposed in the focal plane of said lenticular array.

2. An optical apparatus for selectively recording substantially planar images from any of a plurality of planar sensors in a common plane comprising:

an objective lens system;

optical means for translating to said lens system the images of all of said sensors disposed effectively at one focal plane of said lens system;

a planar lenticular array of minute lenslets disposed substantially at the conjugate focal plane of said lens system;

and an aperture element disposed at the nodal plane of said lens system and movable in discrete steps in at least one direction normal to the optical axis thereof;

whereby successive step-by-step movements of said aperture element record complete interdigitated images from selected sensors on a photosensitive element disposed in the focal plane of said lenticular array.

3. An optical apparatus for selectively recording substantially planar images from any of a plurality of planar sensors in a common plane comprising:

an objective lens system;

a pair of reflecting mirrors for each of the sensors for translating to said lens system the images of all of said sensors disposed effectively at one focal plane of said lens system;

a planar lenticular array of minute lenslets disposed substantially at the conjugate focal plane of said lens system;

and an aperture element disposed at the nodal plane of said lens system and movable in discrete steps in at least one direction normal to the optical axis thereof;

whereby successive step-by-step movements of said aperture element record complete interdigitated images from selected sensors on a photosensitive element disposed in the focal plane of said lenticular array.

References Cited

UNITED STATES PATENTS 2,873,643 2/1959 De Lassus St. Genies --- 88—24
3,151,520 10/1964 Nadeu --------------- 88—24

NORTON ANSHER, *Primary Examiner.*

WAYNE A. SIVERTSON, *Assistant Examiner.*